United States Patent
Kasztenny et al.

(10) Patent No.: US 7,822,578 B2
(45) Date of Patent: Oct. 26, 2010

(54) SYSTEMS AND METHODS FOR PREDICTING MAINTENANCE OF INTELLIGENT ELECTRONIC DEVICES

(75) Inventors: Bogdan Z. Kasztenny, Markham (CA); Lawrence A. Sollecito, Amsterdam, NY (US); Jeffrey G. Mazereeuw, New Market (CA); Zhihong Mao, Stouffville (CA)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 12/140,832

(22) Filed: Jun. 17, 2008

(65) Prior Publication Data

US 2009/0312999 A1    Dec. 17, 2009

(51) Int. Cl.
G06F 19/00 (2006.01)
G06F 17/00 (2006.01)

(52) U.S. Cl. ............ 702/184; 702/60; 702/61; 702/187; 703/4; 703/13

(58) Field of Classification Search .......... 702/184, 702/60, 61, 187
See application file for complete search history.

(56) References Cited

U.S. PATENT DOCUMENTS

| | | |
|---|---|---|
| 4,937,763 A | 6/1990 | Mott |
| 5,019,799 A | 5/1991 | Oshiage et al. |
| 5,414,632 A | 5/1995 | Mochizuki et al. |
| 5,453,939 A | 9/1995 | Hoffman et al. |
| 5,463,567 A | 10/1995 | Boen et al. |
| 5,950,147 A | 9/1999 | Sarangapani et al. |
| 6,119,074 A | 9/2000 | Sarangapani |
| 6,336,065 B1 | 1/2002 | Gibson et al. |
| 6,338,152 B1 | 1/2002 | Fera et al. |
| 6,442,511 B1 | 8/2002 | Sarangapani et al. |
| 2002/0173927 A1* | 11/2002 | Vandiver ............ 702/122 |
| 2008/0049458 A1* | 2/2008 | Pozzuoli et al. ......... 363/21.12 |
| 2008/0172192 A1* | 7/2008 | Banhegyesi ............. 702/61 |
| 2008/0183406 A1* | 7/2008 | Lee et al. ............. 702/58 |

* cited by examiner

*Primary Examiner*—Hal D Wachsman
(74) *Attorney, Agent, or Firm*—GE Global Patent Operation; Roger C. Phillips

(57) ABSTRACT

Predictive maintenance systems and methods are described. A method includes measuring environmental conditions using a plurality of sensors within the IED, processing the environmental measurements to determine long-term exposure factors representing historical operating conditions of the IED, applying a reliability model to the long-term exposure factors, determining a numerical measure of IED life based on the long-term exposure factors and the reliability model, comparing the numerical measure of IED life to preselected boundary values, and signaling if the numerical measure of IED life is outside of the preselected boundary values.

30 Claims, 4 Drawing Sheets

SYSTEMS AND METHODS FOR PREDICTING MAINTENANCE OF INTELLIGENT ELECTRONIC DEVICES

BACKGROUND OF THE INVENTION

The subject matter disclosed herein relates generally to maintenance of intelligent electronic devices used in rugged environments and, more particularly, to systems and methods for facilitating predictive maintenance of intelligent electronic devices based on continuous monitoring of operating conditions, exposure to external factors, and reliability models embedded within the devices.

Electrical grids including incorporated generation, transmission, distribution, and energy conversion means are often operated with the aid of intelligent electronic devices (IEDs). Such devices protect against faults and other abnormal conditions, monitor and meter energy usage, and control other aspects of electrical grid operations. Intelligent electronic devices include, but are not limited to including, protective relays, remote terminal units, programmable logic controllers (PLCs), meters, local human machine interfaces (HMIs), Ethernet switches and/or routers, modems, and other similar devices.

Intelligent electronic devices are often installed and operated in harsh environments, such as high voltage substation control houses, medium voltage switchgear, power plants, industrial plants, and motor control centers. As such, IEDs are exposed to conditions such as extreme temperatures, electromagnetic interference, electrical surges, mechanical shocks and vibration, and chemical agents. At least some known IEDs are designed to withstand such conditions as prescribed by industry standards, established design practices, and/or based on competition between manufacturers.

At least some known IEDs perform critical functions within an electrical grid, such as protection functions and/or control functions. As such, IEDs are needed that remain fully functional during a commissioned time. To ensure that the IEDs retain their desired functions and perform when and as necessary, the IEDs are periodically checked and/or maintained. Periodic maintenance procedures have changed since the use of a previous generation of protection, control, and/or metering devices that included electro-mechanical and analog technologies. At least some known periodic maintenance procedures include visually inspecting an IED for signs of problems and periodically taking the IED out of service, isolating the IED from the rest of the system to which it belongs, and testing the functionality of the IED. The maintenance intervals of such periodic maintenance procedures may be between 2 and 5 years, and are based on factors such as past experience of a given user, a make of the IED being inspected, average operating conditions, a criticality of the application, and other related factors.

Such periodic maintenance procedures, however, are not optimized to consider IEDs having different life expectancies and/or failure rates. IEDs may be installed in operating conditions that differ considerably when compared to average expected operating conditions. Variable operating conditions include easily verifiable factors such as average ambient temperature, and hidden factors such exposure to electromagnetic interference and local operating temperature. Often, all IEDs in a given facility are maintained, regardless of the make and/or operating conditions of the IEDs. As a result, some percentage of IEDs are "over maintained" and some are "under maintained," causing unexpected failures to occur.

Such periodic maintenance procedures miss a significant potential for cost savings to users and/or operators of IEDs. For example, maintenance is an expensive operation due to the amount of associated labor and, in cases where device redundancy has not been employed, the maintenance may require shutting down protected and/or controlled processes and/or assets. In addition, unexpected failures of IEDs require emergency-style responses that involve unscheduled work, unscheduled spare material usage, additional urgency and a need to work without proper preparation, and/or unscheduled shutdowns of protected and/or controlled assets, which may then trigger shutdowns of associated process steps.

At least some known IEDs include microprocessors that enable the IEDs to collect and analyze information from the sensors. However, systems and/or methods are needed that employ information collection and analysis to understand the operating conditions and exposures of IEDs in combination with an embedded knowledge of the life expectancies of the IEDs, such as a reliability model, to generate predictive maintenance requests and/or signals.

BRIEF DESCRIPTION OF THE INVENTION

In one aspect, a method for predicting maintenance of an intelligent electronic device (IED) is provided. The method includes measuring environmental conditions using a plurality of sensors within the IED, processing the environmental measurements to determine long-term exposure factors representing historical operating conditions of the IED, applying a reliability model to the long-term exposure factors, determining a numerical measure of IED life based on the long-term exposure factors and the reliability model, comparing the numerical measure of IED life to preselected boundary values, and signaling if the numerical measure of IED life is outside of the preselected boundary values.

In another aspect, a system is provided for establishing and maintaining reliability models for a plurality of intelligent electronic devices (IEDs). The system includes an acquisition unit configured to acquire long-term exposure factors from the plurality of IEDs, an input unit configured to receive failure information from failed IEDs of the plurality of IEDs, and a processor configured to be coupled to the acquisition unit and the input unit. The processor is programmed to determine a reliability of each IED and derive a reliability model that correlates between the exposure factors and the reliability of each IED.

In another aspect, a system is provided for monitoring operating conditions of an intelligent electronic device (IED) having a plurality of sensors therein for acquiring environmental data. The system includes an acquisition unit configured to acquire long-term exposure factors from the IED, an input unit configured to receive failure information the IED, and a processor configured to be coupled to the acquisition unit and the input unit. The processor is programmed to determine a reliability of the IED, derive a reliability model that correlates between the exposure factors and the reliability of the IED, compare the numerical measure of IED life to preselected boundary values, and generate a signal if the numerical measure of IED life is outside of the preselected boundary values.

BRIEF DESCRIPTION OF THE DRAWINGS

The detailed description below explains the exemplary embodiments of the systems and methods described herein, including advantages and features, by way of example with reference to the drawings.

DETAILED DESCRIPTION OF THE INVENTION

Although the embodiments described below describe monitoring intelligent electronic device (IED) life based on environmental factors such as temperature, surges, and grounding, one of ordinary skill in the art would understand that other environmental factors may also be monitored. Moreover, one of ordinary skill in the art would understand that effects due to environmental factors may change due to flows in engineering or construction, unexpected events, and/or due to intentional use by a user that subjects the IED to accelerated wear. Further, it should be understood that miniaturization and/or integration enables an IED to include one sensor as described below, or a plurality of sensors, such that each IED may monitor multiple environmental factors concurrently. For example, and not by way of limitation, an IED may include a plurality of sensors that enable the IED to concurrently monitor mechanical shock, vibration, humidity, exposure to chemical factors, power supply levels, and/or radiated and/or conducted electromagnetic interference.

Figure 1:
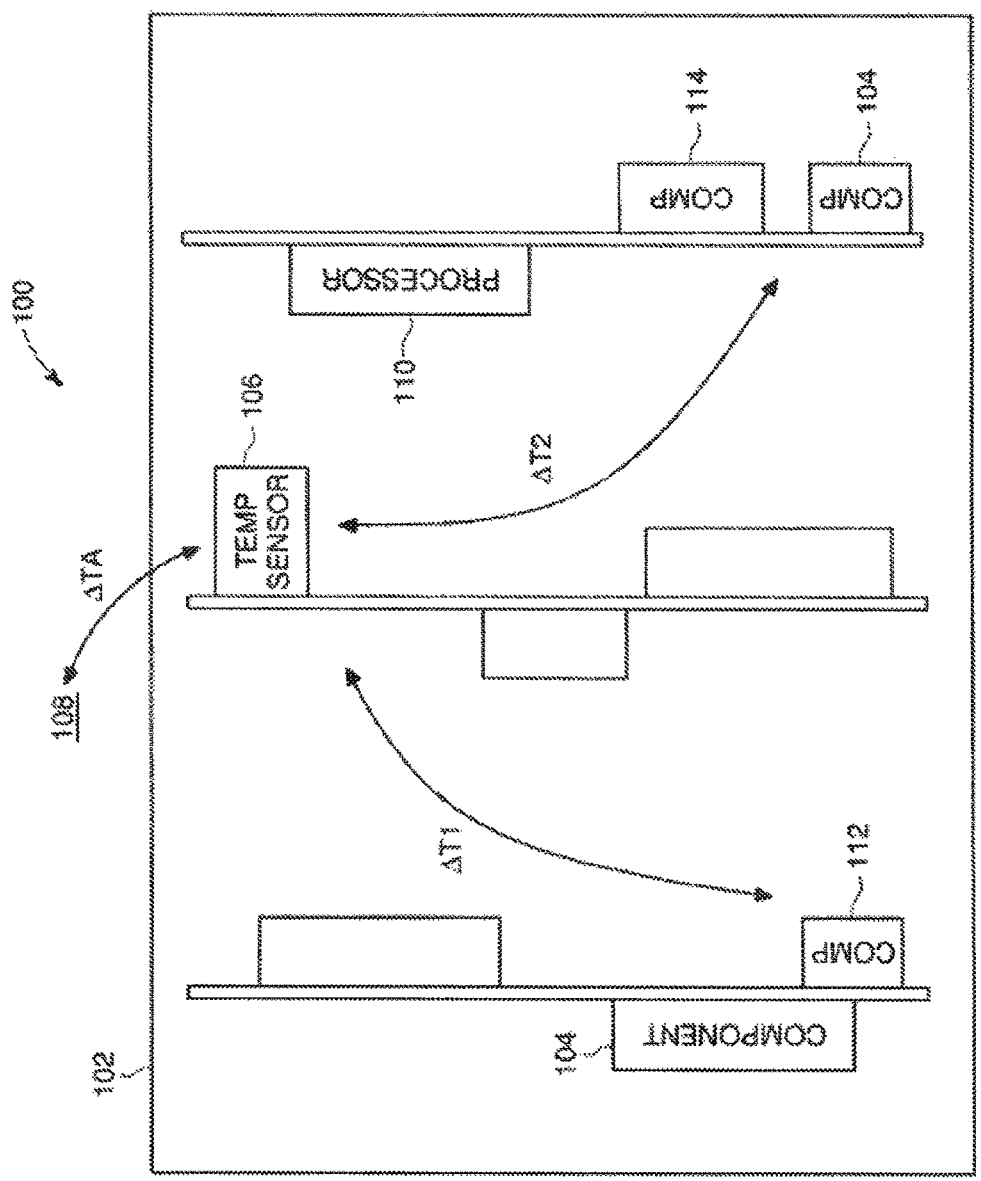
FIG. 1 is a schematic diagram of an exemplary intelligent electronic device (IED) that may be used to monitor operating temperatures.

FIG. 1 is a schematic diagram of an exemplary intelligent electronic device (IED) 100 that may be used to monitor operating temperatures. IED 100 includes a chassis 102 having a plurality of components 104 and at least one temperature sensor 106. In the exemplary embodiment, components 104 are critical components within IED 100 such as, but not limited to, a capacitor, a microcontroller, a graphical display, and/or a communication transceiver. Temperature sensor 106 is positioned within IED 100 such that temperature sensor 106 may monitor temperature points inside IED 100 as well as a temperature of ambient air 108. More specifically, temperature sensor 106 is positioned to facilitate an accurate estimation of a temperature of each component 104 and ambient temperature 108 in order for a processor 110 to determine a temperature gradient between each component 104 and ambient temperature 108.

During operation, and under steady state conditions, a temperature measured by temperature sensor 106 remains at a substantially constant offset $\Delta TA$ with respect to ambient temperature 108. Moreover, the temperature measured by temperature sensor 106 remains at a substantially constant offset with respect to each component 104. For example, the temperature measured by temperature sensor 106 remains at a substantially constant first offset $\Delta T1$ with respect to a first component 112, and remains at a substantially constant second offset $\Delta T2$ with respect to a second component 114. Each offset $\Delta TA$, $\Delta T1$, $\Delta T2$ is determined via calculations and/or measurements during IED construction and/or IED post-construction testing.

In the exemplary embodiment, temperature sensor 106 measures a temperature within IED 100. Temperature sensor 106 generates a signal representative of the measured temperature, and transmits the signal to processor 110. Processor 110 determines an estimated temperature of each component 104 by adding or subtracting the known temperature offset. For example, processor 110 determines an estimated temperature of first component 112 by adding or subtracting $\Delta T1$, as appropriate, from the temperature measured by temperature sensor 106. Moreover, processor 110 determines an estimated temperature difference between an interior operating temperature of IED 100 and ambient temperature 108 by adding or subtracting $\Delta TA$, as appropriate, from the temperature measured by temperature sensor 106.

One of ordinary skill in the art will understand that external conditions such as a style of mounting used for each component 104 and/or temperature sensor 106, patterns of circulating air, and the like, may change a temperature profile within IED 100, thereby affecting the accuracy of the estimation of the temperature of each component 104.

Figure 2:
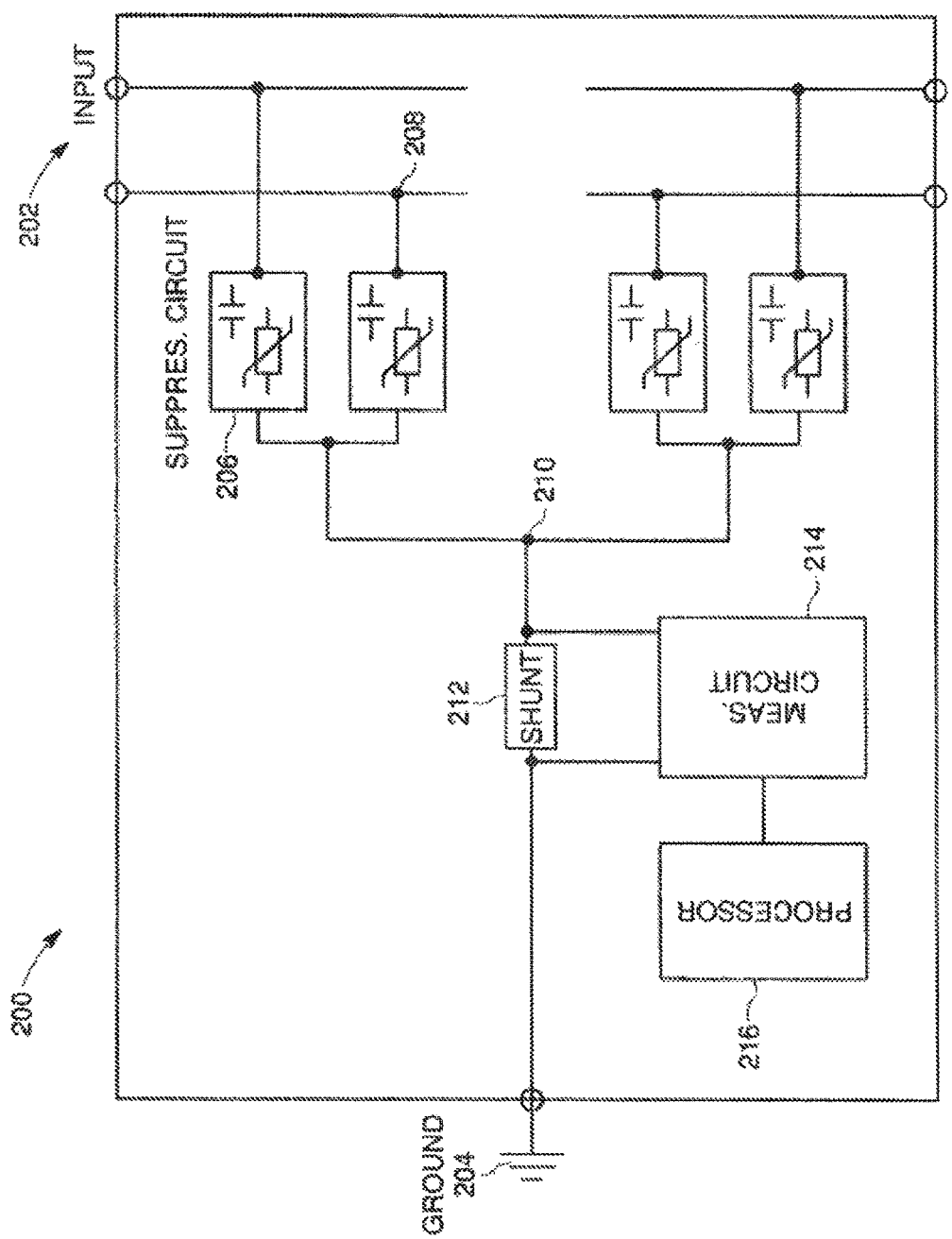
FIG. 2 is a schematic diagram of an exemplary IED that may be used to monitor and/or measure electrical surges.

FIG. 2 is a schematic diagram of an exemplary IED 200 that may be used to monitor and/or measure electrical surges. IED 200 includes a plurality of inputs 202, at least one grounding point 204, and a plurality of surge suppressing circuits 206 that are coupled at a first end 208 to an input 202. Each surge suppressing circuit 206 is also coupled at a second end 210 a shunt 212 to facilitate generating a measurable voltage across shunt 212. Moreover, each surge suppressing circuit 206 is implemented using capacitors and/or non-linear resistors. Shunt 212 may be implemented by, for example and not by way of limitation, a resistor or an RLC circuit that is designed to capture desired frequency components in a surge current. In the exemplary embodiment, the voltage generated across shunt 212 is measured by a surge measuring circuit 214. Surge measuring circuit 214 generates a signal representative of the measured voltage and transmits the signal to a processor 216. The surge current that generated the measured surge voltage is then shunted by shunt 212 to grounding point 204. In an alternative embodiment, shunt 212 is embodied by a plurality of capacitors to integrate high frequency components into a signal representative of the surge current, and surge measuring circuit 214 is implemented by a plurality of standard amplifiers. In such an embodiment, surge measuring circuit 214 amplifies the signal and transmits the signal to an analog-to-digital (A/D) converter (not shown) that digitizes the signal and transmits the digital signal to processor 216. The remaining components of the surge current are shunted by shunt 212 to grounding point 204.

During operation, surge suppressing circuits 206 create a bypass path for high frequency signal components and shunt these components to grounding point 204 without exposing other internal circuitry (not shown) of IED 200 to excessive electrical stress. In the exemplary embodiment, a surge current flows into IED 200 through inputs 202. The surge current flows from each input 202 through an associated surge suppressing circuit 206, thereby bypassing the other internal IED circuitry. The surge current then flows through shunt 212, generating a surge voltage that is proportional to the surge current and a resistance of shunt 212. The surge current then flows to grounding point 204. The surge voltage is measured by surge measurement circuit 214. Surge measurement circuit 214 generates a signal representative of the surge voltage and transmits the signal to processor 216. In an alternative embodiment, the surge current flows through shunt 212, which generates a signal representative of the surge current. Surge measurement circuit 214 amplifies the signal and transmits the signal to processor 216.

Figure 3:
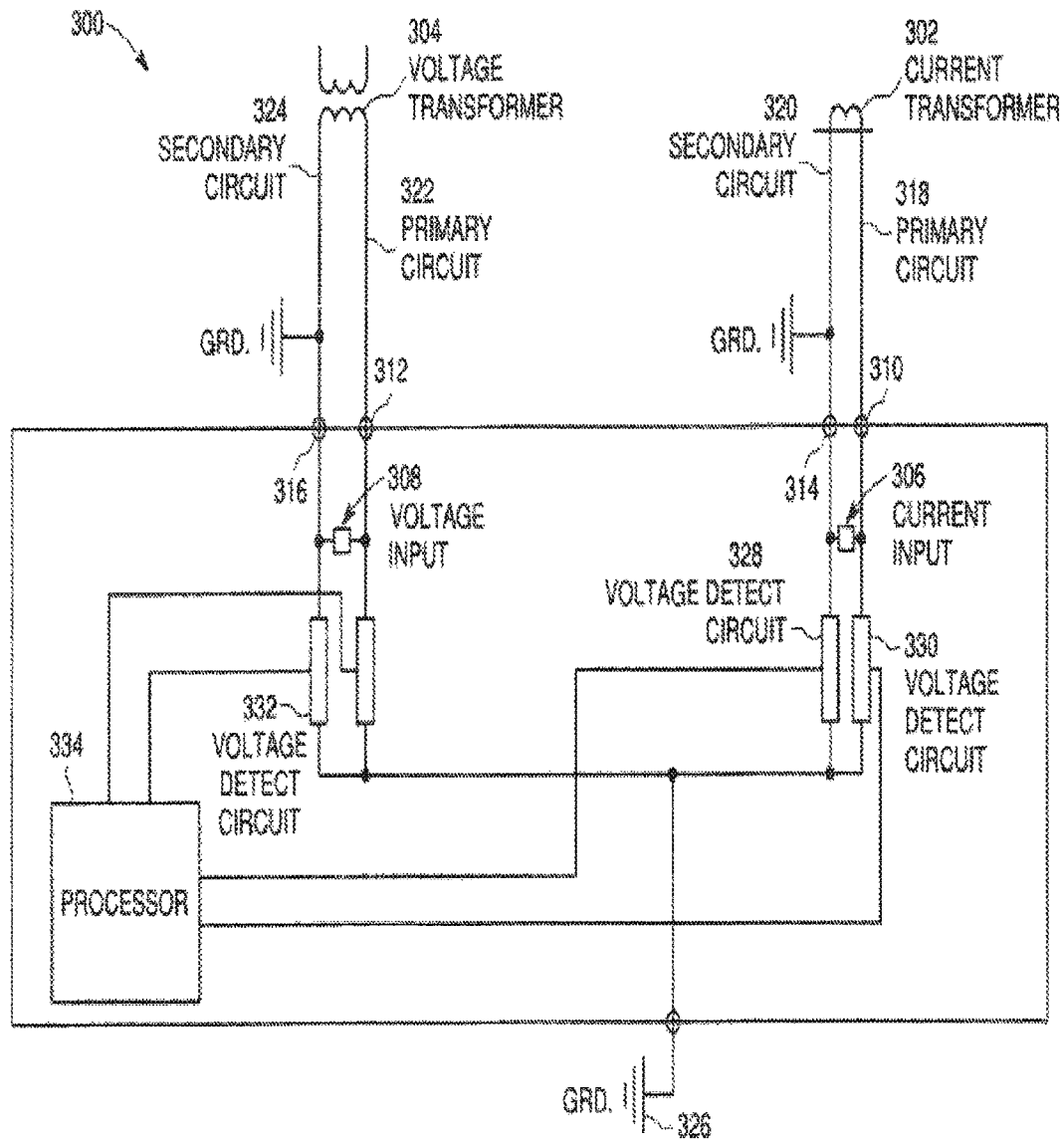
FIG. 3 is a schematic diagram of an exemplary IED that may be used to detect improper grounding of inputs in relation to a grounding point.

FIG. 3 is a schematic diagram of an exemplary IED 300 that may be used to detect improper grounding of inputs in relation to a grounding point. Where an IED, such as IED 300, is coupled to secondary generators of current and/or voltage, generally at least one wire carrying the secondary current and/or secondary voltage is grounded. An example of a secondary generator is a high voltage instrument transformer. Grounding the wire facilitates preventing capacitive coupling with primary generators of current and/or voltage.

In the exemplary embodiment, IED 300 includes a high voltage current transformer 302 and a voltage transformer 304, which are both coupled to respective inputs 306 and 308. Specifically, current input 306 includes input terminal 310, and voltage input 308 includes input terminal 312. IED 300 also includes grounded input terminals 314 and 316, each of which correspond to a respective input 306 and 308. Current transformer 302 includes a primary circuit 318 and a secondary circuit 320 that is coupled to grounded input terminal 314. Similarly, voltage transformer 304 includes a primary circuit 322 and a secondary circuit 324 that is coupled to grounded input terminal 316. Grounding both secondary circuits 320 and 324 maintains grounded input terminals 314 and 316 at ground potential, and the non-grounded input terminals 310 and 312 at a relatively low voltage compared to ground potential. An impedance of current inputs 306 facilitates maintaining both input terminal 310 and grounded input terminal 314 at a potential nearly equal to ground potential. Moreover, an impedance of voltage inputs 308 facilitates maintaining both input terminal 312 and grounded input terminal 316 to within a relatively low voltage difference, such as 10.0 Volts (V) or 100.0 V. In the exemplary embodiment, IED 300 also includes a ground terminal 326, which also facilitates maintaining current input terminal 310 near ground potential with respect to ground terminal 326. Moreover, ground terminal 326 facilitates maintaining voltage input terminal 312 at a low potential with respect to ground terminal 326.

In the exemplary embodiment, IED 300 also includes a plurality of voltage detector circuits 328 that monitor voltages between current inputs 306 and voltage inputs 308. More specifically, a first voltage detector circuit 330 monitors a voltage between current input terminal 310 and ground terminal 314, and a second voltage detector circuit 332 monitors a voltage between voltage input terminal 312 and ground terminal 316. Voltage detector circuits 328 are designed so as to respond to high frequency components of signals input into inputs 306 and 308, as well as to system frequency components of approximately 50.0 Hertz (Hz) and approximately 60.0 Hz. Each voltage detector circuit 328 generates a signal representative of a detected voltage, digitizes the signal, and transmits the digitized signal to a processor 334.

During operation, high voltage current transformer 302 and voltage transformer 304 generate input signals and transmit the input signals to current inputs 306 and voltage inputs 308, respectively. A voltage across the terminals of each input 306 and 308 is monitored by a voltage detector circuit 328. More specifically, first voltage detector circuit 330 monitors a voltage between current input terminal 310 and ground terminal 314, and second voltage detector circuit 332 monitors a voltage between voltage input terminal 312 and ground terminal 316. Each voltage detector circuit 328 generates a signal representative of the detected voltage, digitizes the signal, and transmits the digitized signal to processor 334.

Figure 4:
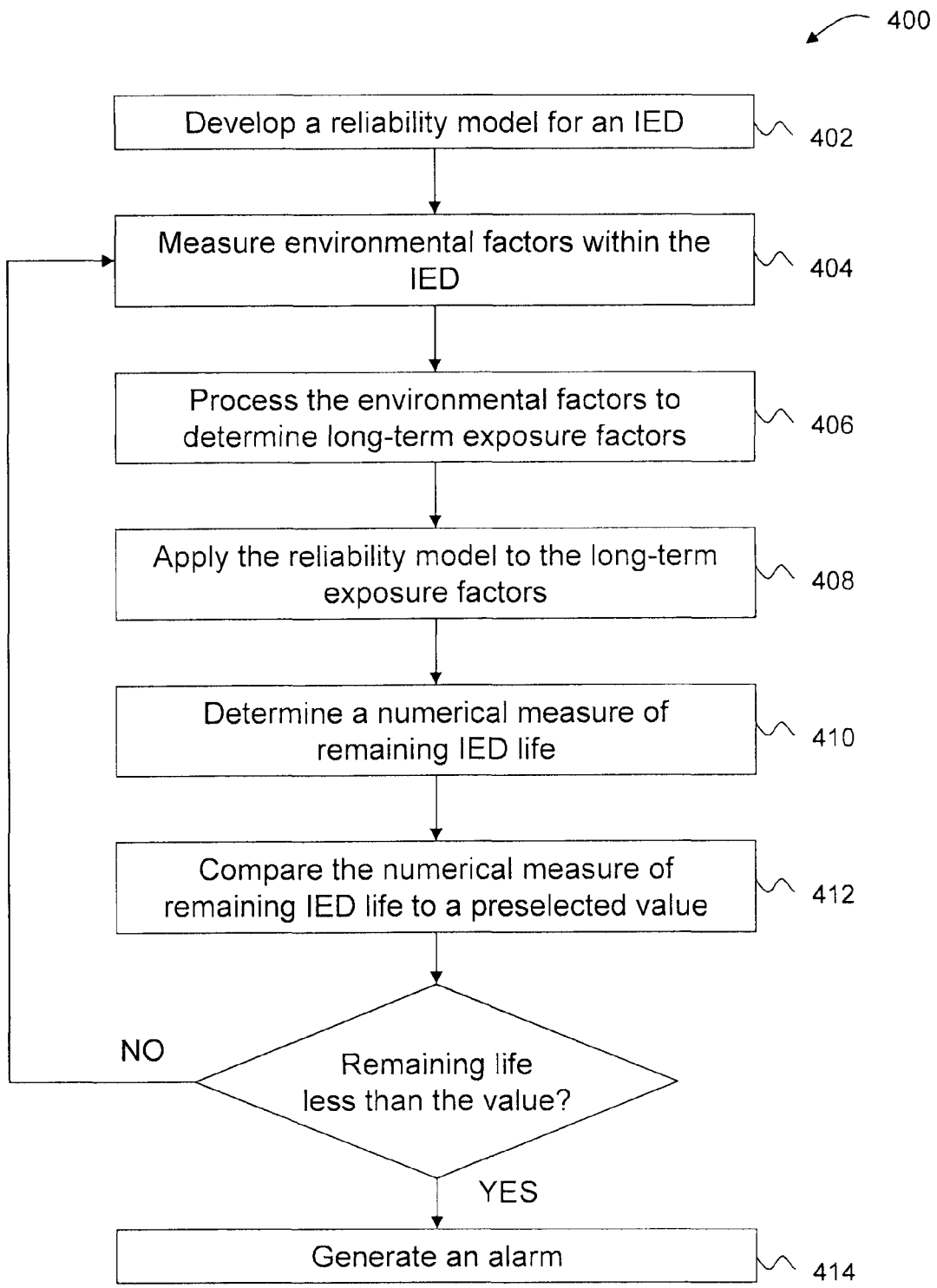
FIG. 4 is a flowchart showing an exemplary predictive maintenance method.

FIG. 4 is a flowchart showing an exemplary predictive maintenance method 400 using an IED. Although the IED is designed to withstand such factors as temperature extremes, electrical surges, improper grounding and exposure to elevated voltages, and the like, per applicable standards and design practices, such factors add wear to the IED and affect the life expectancy of the IED accordingly. Moreover, repetitive exposure of such factors shorten the life expectancy of the IED. As such, method 400 uses measured data, as described above, and applies the measured data to a reliability model developed for the IED. Although method 400 is described below in relation to IED 100 (shown in FIG. 1), it should be understood that method 400 is applicable to predicting maintenance for any IED.

In the exemplary embodiment, a reliability model is developed 402. For example, an integrated circuit, such as a microcontroller, typically exhibits a temperature-reliability relationship with a decline in reliability as the operating temperature exceeds a particular value. Such information is typically available from the integrated circuit manufacturer and may be verified by testing. For example, an integrated circuit that is operated with an internal temperature of 115° C. may have a life expectancy that is half of an expected life-expectancy when operated with an internal temperature of 75° C. A manufacturer of IED 100 may derive the internal operating temperature for each component 104 (shown in FIG. 1) based on a temperature profile of IED 100 and/or by directly measuring one or more points within IED chassis 102 (shown in FIG. 1), as described above. In one embodiment, the reliability model applied to the long-term exposure factors is a deterministic reliability model. In an alternative embodiment, the reliability model is a stochastic reliability model. In further alternative embodiments, the reliability model may be based on, for example, fuzzy mathematics and/or an artificial neural network. In one embodiment, the reliability model is integrated into an operating code of IED 100. In an alternative embodiment, the reliability model is stored by IED 100 as a data entity. Storing the reliability model facilitates enabling an IED operator to upgrade the reliability model. For example, the operator may manually upgrade the reliability model at an TED installation site, or the reliability model may be upgraded from a centrally located application that is remote to the IED.

Next, environmental factors are measured 404 within IED 100 using, for example, temperature sensor 106 (shown in FIG. 1). The measured environmental factors are then processed 406 to determine long-term exposure factors that represent historical operating conditions of IED 100. More specifically, processor 110 (shown in FIG. 1) determines raw measurements, an integral, an average value of raw measurements, and/or a maximum value of raw measurements. For example, a set of internal temperature readings as recorded by temperature sensor 106 are sorted into temperature bands such as −40.0° C. to −25.0° C., −25.0° C. to 0° C., 0° C. to 25.0° C., 25.0° C. to 30.0° C., 30.0° C. to 35.0° C., and so on. A total operating time in each temperature band is accumulated by processor 110.

In the exemplary embodiment, the long-term exposure factors are then applied 408 to the reliability model of IED 100 and/or each component 104. By using the temperature-reliability relationship, or reliability model, a remaining life of each component 104 and/or a probability of a failure may be calculated by processor 110 based on the long-term exposure factors. More specifically, processor 110 determines 410 a numerical measure of remaining IED life based on the long-term exposure factors and the reliability model. Examples of a numerical measure include, but are not limited to including, a remaining life of IED 100, a used life of IED 100, and a rate of wear of IED 100. In one embodiment, the used life of IED 100 may be expressed in a number of time units such as hours, days, weeks, months, and/or years. Further examples of a numerical measure include a ratio of actual wear to normal wear. In one embodiment, the rate of wear of IED 100 is based on operating conditions that are outside a specified range of acceptable operating conditions for IED 100. In one embodiment, the long-term exposure factors are transmitted to a centrally located application that is remote to IED 100, such that the central application applies the long-term exposure factors received from a plurality of IEDs to one or more reliability models and determines a numerical measure of remaining IED life for each of the plurality of IEDs and/or for each individual IED.

In the exemplary embodiment, processor 110 compares 412 the numerical measure of remaining IED life to a preselected remaining life value. If the numerical measure of remaining IED life is less than the preselected remaining life value, processor 110 generates 414 a signal, such as an alarm. The signal may be based on, for example, the determined remaining life of IED 100, the determined used life of IED 100, the determined rate of wear, and/or exceeded operating conditions. In one embodiment, the signal is a visual indication provided to an IED operator by, for example, an alphanumeric message, a light-emitting diode (LED), and the like. In an alternative embodiment, the signal is a physical on/off output. In another alternative embodiment, the signal may be a virtual point created by processor 110 in an operating code and/or programming code of IED 100. For example, in such an embodiment, a maintenance output relay, or fail safe relay, may be opened, thereby de-energizing the relay to signify to the IED operator that IED 100 is in need of attention and/or repair. In such a case, IED 100 may continue to function while signifying to the IED operator that environmental conditions are not normal. Moreover, the opened relay may signify that IED 100 is experiencing wear at an accelerated rate and/or a remaining life of IED 100 has reached a level at which service is necessary. In the exemplary embodiment, sensitivity and/or functionality of the signal may be selected via user settings.

In one embodiment, upon a failure of IED 100 and/or a particular component 104, the long-term exposure factors determined for IED 100 are stored in a memory (not shown) such that the long-term exposure factors may be extracted by, for example, a service technician. Alternatively, the long-term exposure factors may be transmitted by processor 110 to a remote storage device (not shown) for storage. If IED 100 is sent for repair and/or refurbishment, for example after a failure of IED 100 and/or a particular component 104, the stored long-term exposure factors may be augmented to reflect an actual wear of IED 100 in order to reflect the improved operation status of IED 100 due to the repair and/or refurbishment. In addition, the reliability model may be updated to reflect data, such as long-term exposure data, collected by a technician during repair. Upon a significant change in reliability data, a manufacturer of IED 100 may update the reliability model in newly manufactured devices.

The systems and methods described herein facilitate predicting needed maintenance of intelligent electronic devices (IEDs) by using sensors and/or processors to enable the IEDs to collect and analyze information from the sensors. Collecting and analyzing the information facilitates understanding the operating conditions and exposures of IEDs in combination with an embedded knowledge of the life expectancies of the IEDs, such as a reliability model, to generate predictive maintenance requests and/or signals.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Exemplary embodiments of systems and methods for predicting maintenance of an intelligent electronic device (IED) are described above in detail. The systems and methods described herein are not limited to the specific embodiments described herein but, rather, steps of the methods and/or components of the system may be utilized independently and separately from other steps and/or components described herein. Further, the described steps and/or components may also be defined in, or used in combination with, other systems and/or methods, and are not limited to practice with only the systems and methods as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for predicting maintenance of an intelligent electronic device (IED), said method comprising:
    measuring environmental conditions using at least one sensor associated with the IED;
    processing the measured environmental conditions to determine long-term exposure factors, said long-term exposure factors representing conditions of an IED operation;
    applying the determined long-term exposure factors to a reliability model, said reliability model providing a relationship between known exposure factors and characteristics of said IED;
    determining a numerical measure of IED life based on the determined long-term exposure factors and the reliability model;
    comparing the numerical measure of IED life to preselected boundary values; and
    providing a signal when the numerical measure of IED life is outside of the preselected boundary values.

2. A method in accordance with claim 1, wherein said environmental conditions comprises at least one of: a temperature, a peak electrical surge value, a grounding presence, a mechanical shock, a mechanical vibration, a chemical factor, a radiated electromagnetic interference, and a humidity.

3. A method in accordance with claim 1, wherein processing the measured environmental conditions to determine long-term exposure factors comprises:
    determining at least one of: raw sensor measurements, an integration of raw sensor measurements, an average value of raw sensor measurements, and a maximum value of raw sensor measurements.

4. A method in accordance with claim 1, further comprising developing the reliability model using reliability data of key IED components.

5. A method in accordance with claim 1, further comprising:
    developing the reliability model using at least one of accelerated life testing results of the IED and field data obtained for a particular make of the IED.

6. A method in accordance with claim 1, wherein said reliability model is one of: a deterministic reliability model, a stochastic reliability model, a reliability model based on fuzzy mathematics, and a reliability model based on an artificial neural network.

7. A method in accordance with claim 1, wherein determining a numerical measure of IED life comprises determining at least one of: remaining life of the IED, used life of the IED, and a rate of wear of the IED.

8. A method in accordance with claim 7, wherein determining a numerical measure of IED life further comprises determining one of:
a ratio of actual wear to normal wear and a used life of the IED expressed in a number of time units.

9. A method in accordance with claim 7, wherein determining a rate of wear of the IED comprises:
determining a rate of wear based on operating conditions that are outside a specified range of acceptable operating conditions for the IED.

10. A method in accordance with claim 1, wherein providing a signal comprises generating a signal based on at least one of:
a remaining life of the IED, a used life of the IED, and a rate of wear of the IED.

11. A method in accordance with claim 1, wherein providing a signal comprises
at least one of: a visual indication, a physical output, a virtual point created in an operating code of the IED, and a virtual point created in a user programmable code of the IED.

12. A method in accordance with claim 1, further comprising:
storing the long-term exposure factors such that the long-term exposure factors are extractable upon a failure of the IED.

13. A method in accordance with claim 1, further comprising:
upon one of a partial repair of the IED and a refurbishment of the IED, augmenting the long-term exposure factors to reflect an actual wear of the IED.

14. A method in accordance with claim 1, further comprising integrating the reliability model into operating code of the IED.

15. A method in accordance with claim 1, further comprising storing the reliability model as a data entity.

16. A method in accordance with claim 15, further comprising upgrading the reliability model.

17. A method in accordance with claim 1, further comprising:
downloading the long-term exposure factors to a central application that determines a maintenance need for a plurality of IEDs based on the downloaded long-term exposure factors.

18. A method in accordance with claim 1, further comprising remotely updating the reliability model from a central application.

19. A method in accordance with claim 1, further comprising aggregating a plurality of reliability models of an associated plurality of IEDs.

20. A system for establishing and maintaining reliability models for a plurality of intelligent electronic devices (IEDs), said system comprising:
an acquisition unit configured to acquire long-term exposure factors from the plurality of IEDs;
an input unit configured to receive failure information from failed IEDs of the plurality of IEDs; and
a processor configured to be coupled to said acquisition unit and said input unit, said processor programmed to:
obtain a reliability of each IED of the plurality of IEDs; and
derive a reliability model, said reliability model providing a correlation between known exposure factors and the reliability of each IED of the plurality of IEDs.

21. A system in accordance with claim 20, wherein said acquisition unit is further configured to acquire long-term exposure factors from the plurality of IEDs using at least one of an electronic communication and a manual data entry.

22. A system in accordance with claim 20, wherein the long-term exposure factors are related to at least one of: a temperature, a peak electrical surge value, a grounding presence, a mechanical shock, a mechanical vibration, a chemical factor, a radiated electromagnetic interference, and a humidity.

23. A system in accordance with claim 20, wherein the failure information includes at least one of: a time of failure of the IED, a time of degraded performance of the IED, a time of failure of an IED subsystem, and a time of degraded performance of an IED subsystem.

24. A system in accordance with claim 20, wherein the reliability model predicts failures of at least one of the plurality of IEDs and a single IED of the plurality of IEDs.

25. A system in accordance with claim 20, wherein the plurality of IEDs is user-controlled, and wherein said processor is further programmed to derive the reliability model based on the plurality of IEDs.

26. A system in accordance with claim 20, wherein said processor is further programmed to derive the reliability model based on data provided by a manufacturer of the plurality of IEDs.

27. A system for monitoring operating conditions of an intelligent electronic device (IED) having a plurality of sensors therein for acquiring environmental data among a plurality of IEDs, said system comprising:
an acquisition unit configured to acquire long-term exposure factors from the plurality of sensors associated with selected ones of the plurality of IEDs;
an input unit configured to receive failure information from failed IEDs of the plurality of IEDs; and
a processor configured to be coupled to said acquisition unit and said input unit, said processor programmed to:
obtain a reliability of each of the plurality of IEDs;
derive a reliability model, said reliability model providing a correlation between known exposure factors and the reliability of each of the plurality of IEDs, said reliability model being further adapted based on said acquired long-term exposure factors and said received failure information;
determine a numerical measure of IED life of at least one IED based on the acquired sensor information associated with said at least one IED;
compare the numerical measure of a remaining IED life of said at least one IED to preselected boundary values associated with said IED; and
generate a signal when the numerical measure of the IED life is outside of the preselected boundary values.

28. A system in accordance with claim 27, wherein said processor is further configured to develop the reliability model using reliability data of key IED components.

29. A system in accordance with claim 28, wherein said processor is further programmed to determine a numerical measure of IED life by determining at least one of: a remaining life of the IED, a used life of the IED, and a rate of wear based on operating conditions that are outside a specified range of acceptable operating conditions of the IED.

30. A system in accordance with claim 28, wherein said processor is further programmed to generate a signal based on at least one of a remaining life of the IED, a used life of the IED, and a rate of wear based on operating conditions that are outside a specified range of acceptable operating conditions of the IED.

* * * * *